United States Patent
Smith, Jr.

(10) Patent No.: US 10,787,831 B2
(45) Date of Patent: *Sep. 29, 2020

(54) AUTONOMOUS SWIMMING POOL SKIMMER

(71) Applicant: J. Murray Smith, Jr., Dallas, TX (US)

(72) Inventor: J. Murray Smith, Jr., Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/443,539

(22) Filed: Jun. 17, 2019

(65) Prior Publication Data

US 2019/0301188 A1    Oct. 3, 2019

Related U.S. Application Data

(63) Continuation-in-part of application No. 15/676,813, filed on Aug. 14, 2017, now Pat. No. 10,385,582.

(51) Int. Cl.
*E04H 4/16* (2006.01)
*C02F 1/40* (2006.01)
*C02F 1/00* (2006.01)
*C02F 103/42* (2006.01)

(52) U.S. Cl.
CPC .......... *E04H 4/1654* (2013.01); *C02F 1/001* (2013.01); *C02F 1/40* (2013.01); *C02F 2103/42* (2013.01); *C02F 2201/008* (2013.01); *C02F 2201/009* (2013.01)

(58) Field of Classification Search
CPC .......... E04H 4/1654; C02F 1/001; C02F 1/40; C02F 2201/008; C02F 2201/009; C02F 2103/42
USPC .. 210/739, 776, 167.1, 167.19, 167.2, 242.1
See application file for complete search history.

(56) References Cited

U.S. PATENT DOCUMENTS

| 3,767,055 A | 10/1973 | Flatland |
| 3,860,518 A | 1/1975 | Henricksen |
| 4,626,358 A | 12/1986 | Fetsko |
| 4,746,424 A | 5/1988 | Drew |

(Continued)

FOREIGN PATENT DOCUMENTS

| FR | 2791947 A3 | 10/2000 |
| WO | WO9109193 A1 | 6/1991 |
| WO | WO9620772 A1 | 7/1996 |

OTHER PUBLICATIONS

"Pool Surface Skimmers and Cleaners," Aqualab Systems., Inc., copyright 2002-17, accessed Aug. 14, 2017, 9 pages. http://www.askalanaquestion.com/pool_surface_skimmers.htm.

(Continued)

*Primary Examiner* — Fred Prince
(74) *Attorney, Agent, or Firm* — Yee & Associates, P.C.

(57) ABSTRACT

A swimming pool skimmer comprises a buoyant skimmer body. The swimming pool skimmer further comprises an electrical power supply including a solar cell mounted to a topside of the skimmer body. A set of proximity sensors are operatively connected to the electrical power supply, and are mounted at a forward end of the skimmer body. The set of proximity sensors are configured to generate a signal in response to detecting an obstruction. A set of pump jets are operatively connected to both the electrical power supply and the set of proximity sensors. The set of pump jets are configured to activate in response to the signal from the set of proximity sensors, thereby rotating the swimming pool skimmer away from the obstruction.

22 Claims, 8 Drawing Sheets

(56) References Cited

U.S. PATENT DOCUMENTS

| | | | |
|---|---|---|---|
| 4,900,432 A | | 2/1990 | Arnold et al. |
| 5,022,987 A | | 6/1991 | Wells |
| 5,106,492 A | | 4/1992 | Distinti et al. |
| 5,128,031 A | | 7/1992 | Midkiff |
| 6,074,553 A | * | 6/2000 | Haski ............... E04H 4/1263 |
| | | | 210/167.2 |
| 7,037,038 B1 | * | 5/2006 | Haski ............... B60L 53/36 |
| | | | 405/60 |
| 7,101,475 B1 | | 9/2006 | Maaske et al. |
| 2006/0060513 A1 | | 3/2006 | Craig |
| 2006/0102532 A1 | | 5/2006 | Cadotte |
| 2012/0305461 A1 | | 12/2012 | Veronie |
| 2014/0262997 A1 | | 9/2014 | Renaud et al. |
| 2018/0142487 A1 | | 5/2018 | Durvasula et al. |
| 2019/0048608 A1 | | 2/2019 | Smith, Jr. |

OTHER PUBLICATIONS

"Solar Breeze, Automatic Pool Skimmer, Pool Cleaning Revolution," Solar Breeze, copyright 2002-2017, accessed Aug. 14, 2017, 4 pages. https://solar-breeze.com/solar-breeze-automatic-pool-skimmer/.

"Pool Surface Cleaners," Dragonfly, copyright 2017, accessed Aug. 14, 2017, 4 pages. https://www.dragonfly.biz/automatic-pool-cleaners/.

Office Action, dated Nov. 26, 2018, regarding U.S. Appl. No. 15/676,813, 9 pages.

Notice of Allowance, dated Apr. 4, 2019, regarding U.S. Appl. No. 15/676,813, 7 pages.

* cited by examiner

AUTONOMOUS SWIMMING POOL SKIMMER

CROSS-REFERENCE TO RELATED APPLICATION

This application is a continuation-in-part of co-pending U.S. patent application Ser. No. 15/676,813, filed Aug. 14, 2017, status: Allowed, which is incorporated by reference herein.

BACKGROUND INFORMATION

1. Field

The present disclosure relates generally to water treatment apparatuses and, more particularly, to autonomous swimming pool skimmers.

2. Background

As most owners of outdoor swimming pools know, keeping the pool free of debris, such as leaves and the like, can be an onerous job. If such floating debris is not timely removed from the pool, it may become saturated and sink. Sunken debris readily clogs the swimming pool's filtration system if the debris is not vacuumed from the pool.

Skimmer devices that float on top of the water in a swimming pool are somewhat successful at removing floating debris. Autonomous skimmer devices can be left in a swimming pool to collect debris with various levels of efficiency.

However, navigation of these skimmer devices around the surface of a pool is often problematic. Known skimmer devices may have a system for propelling the skimmer device in a linear path. However, these devices often lack a system for navigating around obstacles, and can easily become stuck against pool walls.

It would be desirable to have a method and apparatus that take into account at least some of the issues discussed above, as well as other possible issues. For example, it would be desirable to have a method and apparatus that overcome a technical problem by efficiently removing floating debris from a swimming pool using an autonomous swimming pool skimmer.

SUMMARY

An embodiment of the present disclosure provides a swimming pool skimmer. The swimming pool skimmer comprises a buoyant skimmer body. The swimming pool skimmer further comprises an electrical power supply including a solar cell. The solar cell is mounted to a topside of the skimmer body. The swimming pool skimmer further comprises a set of proximity sensors. The set of proximity sensors are operatively connected to the electrical power supply. The set of proximity sensors are mounted at a forward end of the skimmer body. The set of proximity sensors are configured to generate a signal in response to detecting an obstruction. The swimming pool skimmer further comprises a set of pump jets. The set of pump jets are operatively connected to both the electrical power supply and the set of proximity sensors. The set of pump jets are configured to activate in response to the signal from the set of proximity sensors, thereby rotating the swimming pool skimmer away from the obstruction.

Another embodiment of the present disclosure provides method for removing debris from a swimming pool. The method comprises propelling a swimming pool skimmer in a forward direction. The method further comprises detecting an obstruction forward of the swimming pool skimmer. The obstruction is detected by a set of proximity sensors mounted at a forward end of the skimmer body. The method further comprises generating a signal by the set of proximity sensors in response to detecting the obstruction. The method further comprises, in response to the signal from the set of proximity sensors, rotating the swimming pool skimmer away from the obstruction by activating a set of pump jets Yet another embodiment of the present disclosure provides a swimming pool skimmer. The swimming pool skimmer comprises a buoyant skimmer body. The swimming pool skimmer further comprises an electrical power supply including a solar cell. The solar cell is mounted to a topside of the skimmer body. The swimming pool skimmer further comprises a set of proximity sensors. The set of proximity sensors is operatively connected to the electrical power supply. The set of proximity sensors is mounted at a forward end of the skimmer body. The set of proximity sensors is configured to generate a signal in response to detecting an obstruction. The swimming pool skimmer further comprises a set of pump jets. The set of pump jets is operatively connected to both the electrical power supply and the set of proximity sensors. The swimming pool skimmer further comprises a set of inlet ports extending through the skimmer body. The set of inlet ports is configured to allow a fluid intake to the set of pump jets. The swimming pool skimmer further comprises a set of screen filter associated with the set of inlet port. The set of screen filters protrude outward from the skimmer body. The set of screen filter has a protruding hemispherical shape configured to reduce a pressure differential between the inlet port and a surrounding fluid when the set of pump jets are activated. The swimming pool skimmer further comprises a set of outlet ports extending through the skimmer body. The set of outlet ports are configured to allow a fluid output from the set of pump jets. Both the set of inlet port and the set of outlet port are positioned beneath a waterline of the skimmer body. The set of pump jets are configured to activate in response to the signal from the set of proximity sensors, thereby rotating the swimming pool skimmer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current swimming pool skimmers are not as efficient as desired. For example, current swimming pool skimmers often lack a system for navigating around obstacles, and can easily become stuck against pool walls.

The illustrative embodiments provide a method and apparatus for removing debris from a swimming pool. In one illustrative example, a swimming pool skimmer comprises a buoyant skimmer body. The swimming pool skimmer further comprises an electrical power supply including a solar cell. The solar cell is mounted to a topside of the skimmer body. The swimming pool skimmer further comprises a set of proximity sensors. The set of proximity sensors is operatively connected to the electrical power supply. The set of proximity sensors is mounted at a forward end of the skimmer body. The set of proximity sensors is configured to generate a signal in response to detecting an obstruction. The swimming pool skimmer further comprises a set of pump jets. The set of pump jets is operatively connected to both the electrical power supply and the set of proximity sensors. The swimming pool skimmer further comprises a set of inlet ports extending through the skimmer body. The set of inlet ports is configured to allow a fluid intake to the set of pump jets. The swimming pool skimmer further comprises a set of screen filters associated with the set of inlet ports. The set of screen filters protrude outward from the skimmer body. The set of screen filters has a protruding hemispherical shape configured to reduce a pressure differential between the inlet port and a surrounding fluid when the set of pump jets is activated. The swimming pool skimmer further comprises a set of outlet ports extending through the skimmer body. The set of outlet ports are configured to allow a fluid output from the set of pump jets. Both the set of inlet ports and the set of outlet ports are positioned beneath a waterline of the skimmer body. The set of pump jets are configured to activate in response to the signal from the set of proximity sensors, thereby rotating the swimming pool skimmer.

Figure 1:
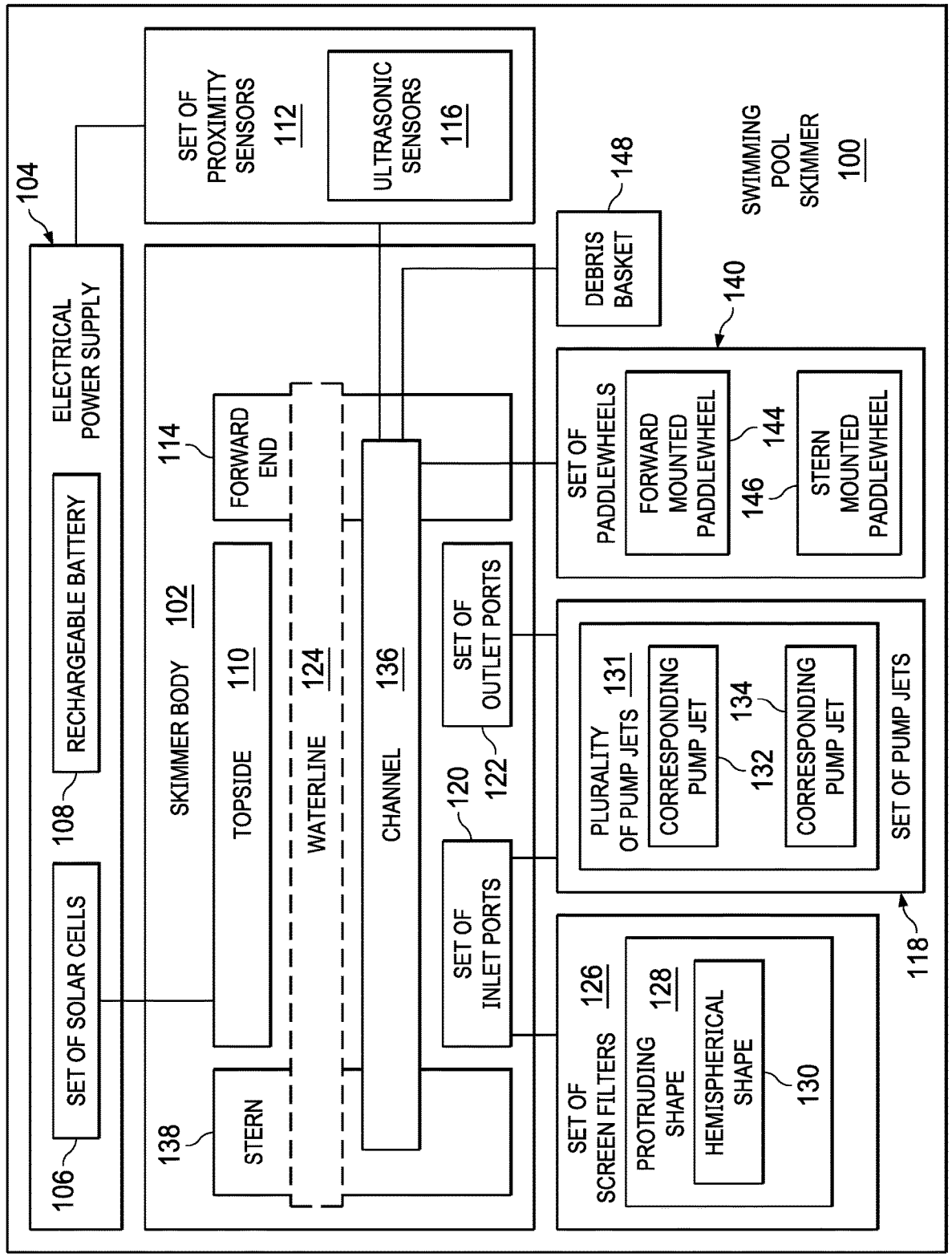
FIG. 1 is an illustration of a block diagram of a swimming pool skimmer in accordance with an illustrative embodiment.

With reference now to the figures and, in particular, with reference to FIG. 1, an illustration of a block diagram of a swimming pool skimmer is depicted in accordance with an illustrative embodiment. Swimming pool skimmer 100 is a device designed to float in a swimming pool and remove floating debris from the surface the water.

As depicted, swimming pool skimmer 100 includes a number of different components. As used herein, "a number of" is one or more items. For example, "a number of components" is one or more components.

Swimming pool skimmer 100 includes skimmer body 102. Skimmer body 102 is buoyant, such that swimming pool skimmer 100 remains afloat when in use. In one illustrative example, skimmer body 102 is made buoyant by a number of pontoon elements (not shown) forming channel 136 that extends from forward end 114 to stern 138 on the underside of skimmer body 102. Skimmer body 102 provides a platform to which other components of swimming pool skimmer 100 can be attached or enclosed.

Swimming pool skimmer 100 further includes electrical power supply 104. Electrical power supply 104 provides power to other components of swimming pool skimmer 100. Electrical power supply 104 includes set of solar cells 106 mounted to topside 110 of skimmer body 102. As used herein, "a set of" is one or more items. For example, "a set of solar cells" is one or more solar cells.

Set of solar cells 106 is an electrical device that converts light energy, i.e. photons, into electricity. Set of solar cells 106 can be a layered semiconductor structure alternately doped with different elements to create a P-N junction. For example, set of solar cells 106 can comprise a layer of phosphorus-doped (N-type) silicon atop a layer of boron-doped (P-type) silicon. When set of solar cells 106 is exposed to light energy, the electrical field created at the P-N junction directs light-stimulated electrons into an electrical current that provides electric power to attached components.

Electrical power supply 104 includes rechargeable battery 108. Rechargeable battery 108 is a set of electrical batteries operatively connected to set of solar cells 106. Current from set of solar cells 106 can be directed into and stored within rechargeable battery 108. Rechargeable battery 108 can be used as an alternative power source for the different components of swimming pool skimmer 100. For example, rechargeable battery 108 may be used to supplement or replace electrical power from set of solar cells 106 during low solar conditions.

Swimming pool skimmer 100 further includes set of proximity sensors 112. Set of proximity sensors 112 is operatively connected to electrical power supply 104. Set of proximity sensors 112 is mounted at forward end 114 of the skimmer body 102. Set of proximity sensors 112 is configured to generate a signal in response to detecting an obstruction.

Set of proximity sensors 112 is an electronic device that detects the presence or absence of objects by detecting at least one of electromagnetic fields, light, and sound. In one illustrated example, set of proximity sensors 112 emits a beam of electromagnetic radiation and detects changes in a return signal reflected from a target. Set of proximity sensors 112 can include at least one type of sensor. For example, set the proximity sensors 112 can include at least one of capacitive sensors, capacitive displacement sensors, Doppler effect sensors, eddy current sensors, inductive sensors, magnetic sensors, optical sensors, radar sensors, sonar sensors, ultrasonic sensors, fiber optic sensors, and Hall effect sensors.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In one illustrative example, set of proximity sensors 112 comprises set of ultrasonic sensors 116. Set of ultrasonic sensors 116 is a device that determines the distance to an object by using sound waves. Set of ultrasonic sensors 116 measures distance by emitting a specific frequency sound wave and detecting a return wave reflected off a target. By measuring a time differential between the emitted and reflected waves set of ultrasonic sensors 116 determines the distance between swimming pool skimmer 100 and the target. When the distance is less than a predefined threshold, the target may be considered an obstruction to forward travel of swimming pool skimmer 100. The obstruction can be, for example, a side of the swimming pool. In response to detecting the obstruction, set of proximity sensors 112 generates a signal, which is received by set of pump jets 118.

Swimming pool skimmer 100 further includes set of set of pump jets 118. Set of pump jets 118 is operatively connected to both electrical power supply 104 and set of proximity sensors 112. Set of pump jets 118 is pumps configured to rotate swimming pool skimmer 100 in response to the signal from set of proximity sensors 112.

Set of inlet ports 120 extends through skimmer body 102 and is associated with set of pump jets 118. Set of inlet ports 120 is positioned beneath waterline 124 of skimmer body 102. Waterline 124 is the line around skimmer body 102 that meets the surface of the water. Set of inlet ports 120 allows water to pass through skimmer body 102 and to enter set of pump jets 118. In this manner, set of inlet ports 120 is configured to allow a fluid intake to set of pump jets 118.

Set of outlet ports 122 extends through skimmer body 102 and is associated with set of pump jets 118. Set of outlet ports 122 is positioned beneath waterline 124 of skimmer body 102. Set of outlet ports 122 allows water to pass through skimmer body 102 and to exit set of pump jets 118. In this manner, set of inlet ports 120 is configured to allow a fluid output from set of pump jets 118.

When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Set of pump jets 118 increases the pressure of fluid entering through set of inlet ports 120, and expels the pressurized fluid outwardly through set of outlet ports 122. In one illustrative example, set of pump jets 118 is positioned around the periphery of skimmer body 102 to create a torque that rotates swimming pool skimmer 100.

Swimming pool skimmer 100 may further comprise set of screen filters 126. Set of screen filters 126 is associated with set of inlet ports 120. Set of screen filters 126 protrudes outward from skimmer body 102.

Set of screen filters 126 is a type of rigid or semi-rigid mesh applied over set of inlet ports 120. Set of screen filters 126 prevents the intake of debris from the swimming pool into set of pump jets 118.

In one illustrative example, set of screen filters 126 has protruding shape 128. Protruding shape 128 is a shape of set of screen filters 126 that protrudes outward from skimmer body 102. Protruding shape 128 is a shape that is configured to reduce a pressure differential between set of inlet ports 120 and a surrounding fluid when set of pump jets 118 is activated. By reducing the pressure differential, protruding shape 128 reduces or eliminates debris that might otherwise become entrapped against set of screen filters 126, thereby reducing the operational efficiency of set of pump jets 118. In one illustrative example, protruding shape 128 is hemispherical shape 130.

In one illustrative example, set of pump jets 118 can comprise plurality of pump jets 131. Plurality of pump jets 131 includes corresponding pump jet 132 and corresponding pump jet 134. Corresponding pump jet 132 is positioned opposite from corresponding pump jet 134, and is distally located around the periphery of skimmer body 102 from corresponding pump jet 134. Furthermore, set of outlet ports 122 for corresponding pump jet 132 may be directed opposite from, and off-axis from, set of outlet ports 122 for corresponding pump jet 134. When activated, the off-axis and opposing outputs from corresponding pump jet 132 and corresponding pump jet 134 create a torque that rotates swimming pool skimmer 100.

Swimming pool skimmer 100 may further comprise channel 136. Channel 136 extends from forward end 114 to stern 138 on the underside of skimmer body 102. Channel 136 may be formed between adjacent pontoon elements (not shown) that provide buoyancy to skimmer body 102.

Swimming pool skimmer 100 further comprises debris basket 148. Debris basket 148 is removably mounted within channel 136. Debris basket 148 receives and retains floating debris from the surface of the water that flows through channel 136.

Swimming pool skimmer 100 further comprises set of paddlewheels 140. Set of paddlewheels 140 is operatively connected to electrical power supply 104. Set of paddlewheels 140 is rotatably mounted within channel 136. Power from electrical power supply 104 rotates set of paddlewheels 140. Rotation of set of paddlewheels 140 forwardly propels swimming pool skimmer 100 through the swimming pool.

In one illustrative example, set of paddlewheels 140 includes forward mounted paddlewheel 144 and stern mounted paddlewheel 146. Forward mounted paddlewheel 144 is rotatably mounted within channel 136 at forward end 114 of skimmer body 102. Stern mounted paddlewheel 146 is rotatably mounted within channel 136 at stern 138 of skimmer body 102. Debris basket 148 may be removably mounted in channel 136 between forward mounted paddlewheel 144 and stern mounted paddlewheel 146. In this illustrative example, rotation of forward mounted paddlewheel 144 propels fluid and floating debris through channel 136 and into debris basket 148.

Figure 2:
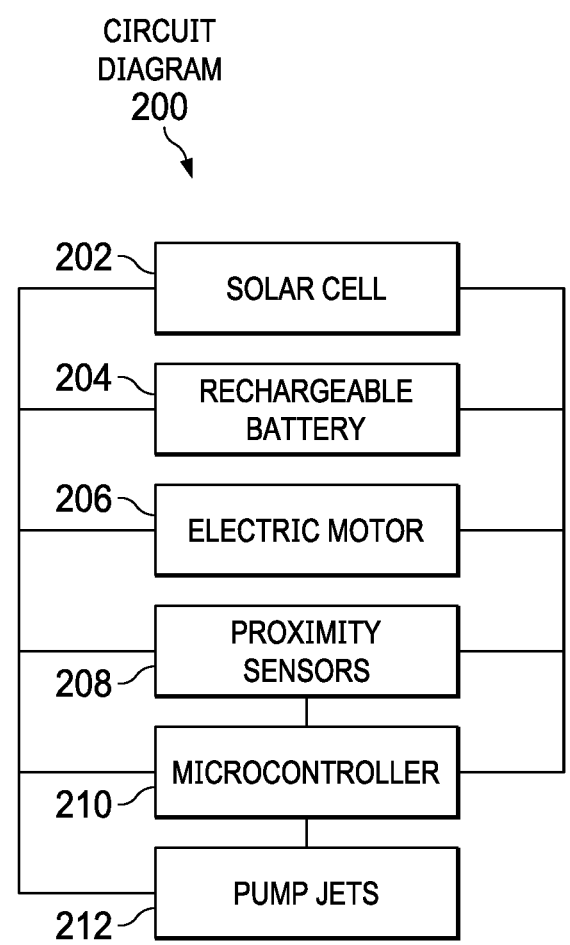
FIG. 2 is an illustration of a block diagram of a simplified circuit diagram for a swimming pool skimmer in accordance with an illustrative embodiment.

With reference next to FIG. 2, an illustration of a block diagram of a simplified circuit diagram for a swimming pool skimmer is depicted in accordance with an illustrative embodiment. Circuit diagram 200 is an example of the various components that can be operatively connected in a swimming pool skimmer, such as swimming pool skimmer 100 shown in block form in FIG. 1.

Circuit diagram 200 includes solar cell 202 and rechargeable battery 204. Solar cell 202 is one illustrative example of a solar cell, such as one of set of solar cells 106 shown in block form in FIG. 1. Rechargeable battery 204 is one illustrative example of a rechargeable battery, such as rechargeable battery 108 shown in block form in FIG. 1. Collectively, solar cell 202 and rechargeable battery 204 form an electrical power supply, such as electrical power supply 104 shown in block form in FIG. 1.

Solar cell 202 is operatively connected to rechargeable battery 204. When solar cell 202 is operatively connected to rechargeable battery 204, electrical energy from solar cell 202 can be directed into and stored within rechargeable battery 204.

Circuit diagram 200 includes electric motor 206. Electric motor 206 is operatively connected to both solar cell 202 and rechargeable battery 204. When electric motor 206 is operatively connected to solar cell 202 and rechargeable battery 204, electric motor 206 converts electrical energy from at least one of solar cell 202 and rechargeable battery 204 into mechanical energy. Mechanical energy from electric motor 206 can be used to drive a set of paddlewheels, such as set of paddlewheels 140 shown in block form in FIG. 1.

Circuit diagram 200 includes proximity sensors 208. Proximity sensors 208 is one illustrative example of a proximity sensor, such as one of set of proximity sensors 112 shown in block form in FIG. 1.

Proximity sensors 208 are operatively connected to both solar cell 202 and rechargeable battery 204. When proximity sensors 208 are operatively connected to solar cell 202 and rechargeable battery 204, proximity sensors 208 convert electrical energy from at least one of solar cell 202 and rechargeable battery 204 into an emitted electromagnetic field, light, or sound. Proximity sensors 208 can then detect a reflected signal to determine the presence of an obstruction.

Circuit diagram 200 includes microcontroller 210. Microcontroller 210 is a small computer used to automatically control the operation of pump jets 212. Microcontroller 210 can be a separate, single integrated circuit, such as a system on a chip. Alternatively, microcontroller 210 can be integrated with proximity sensors 208.

Microcontroller 210 is operatively connected to solar cell 202, rechargeable battery 204, proximity sensors 208, and pump jets 212. When microcontroller 210 is operatively connected in the described manner, microcontroller 210 generates a signal to pump jets 212 in response to receiving an indication of an obstruction from proximity sensors 208. Additionally, microcontroller 210 may terminate the signal to pump jets 212, or generate a second signal to pump jets 212 when proximity sensors 208 no longer detect an obstruction.

Circuit diagram 200 includes pump jets 212. Pump jets 212 are one illustrative example of pump jets, such as one of set of pump jets 118 shown in block form in FIG. 1.

Pump jets 212 are operatively connected to both solar cell 202, rechargeable battery 204, and microcontroller 210. When pump jets 212 are operatively connected in the described manner, microcontroller 210 directs electrical energy from at least one of solar cell 202 and rechargeable battery 204 to drive pump jets 212 in response to receiving an indication of an obstruction from proximity sensors 208.

Figure 3:
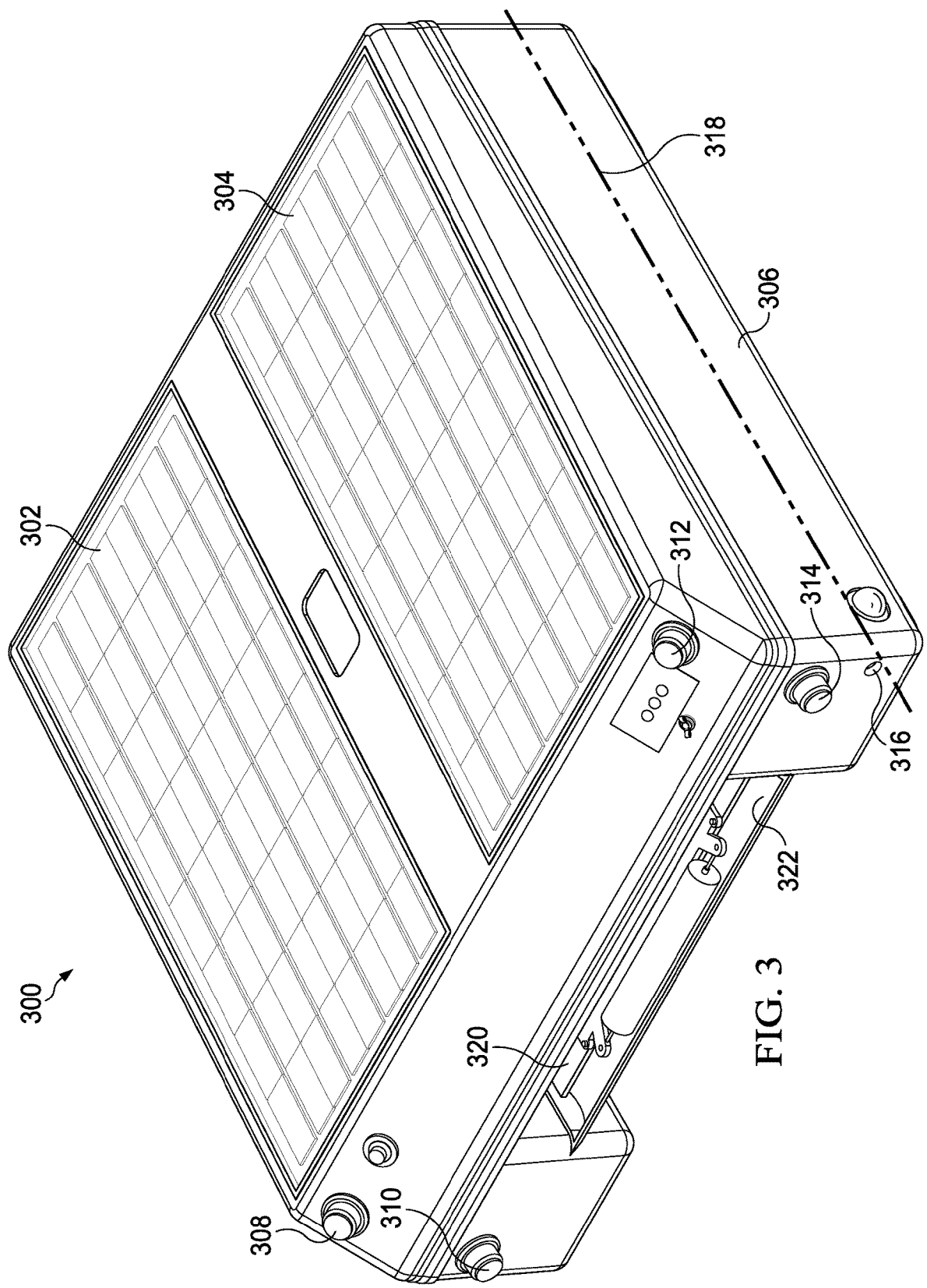
FIG. 3 is an illustration of a perspective view of a swimming pool skimmer in accordance with an illustrative embodiment.

With reference next to FIG. 3, an illustration of a perspective view of a swimming pool skimmer is depicted in accordance with an illustrative embodiment. Swimming pool skimmer 300 in FIG. 3 is an example of one illustrative embodiment for a swimming pool skimmer, such as swimming pool skimmer 100 shown in block form in FIG. 1.

As depicted, swimming pool skimmer 300 includes solar cell array 302 and solar cell array 304. Solar cell array 302 and solar cell array 304 are both examples of one of set of solar cells 106 shown in block form in FIG. 1. Solar cell array 302 and solar cell array 304 are mounted to a top side of skimmer body 306. Solar cell array 302 and solar cell array 304 provide electrical power to the components of swimming pool skimmer 300.

As depicted, swimming pool skimmer 300 includes proximity sensor 308, proximity sensor 310, proximity sensor 312, and proximity sensor 314. Each of proximity sensor 308, proximity sensor 310, proximity sensor 312, and proximity sensor 314 is an example of one of set of proximity sensors 112 shown in block form in FIG. 1.

As depicted, swimming pool skimmer 300 includes outlet port 316. Outlet port 316 is an example of one of set of outlet ports 122 shown in block form in FIG. 1.

Outlet port 316 extends through skimmer body 306 and is associated with a pump jet (not shown), such as one of set of pump jets 118 shown in block form in FIG. 1. The associated pump jet can be retained within the interior of skimmer body 306. Outlet port 316 is positioned beneath waterline 318 of skimmer body 306. Outlet port 316 allows water to pass through skimmer body 306 and to exit the associated pump jet.

As depicted, swimming pool skimmer 300 also includes forward mounted paddlewheel 320 and debris basket 322. Forward mounted paddlewheel 320 is an example of forward mounted paddlewheel 144 shown in block form in FIG. 1. Debris basket 322 is an example of debris basket 148 shown in block form in FIG. 1.

Figure 4:
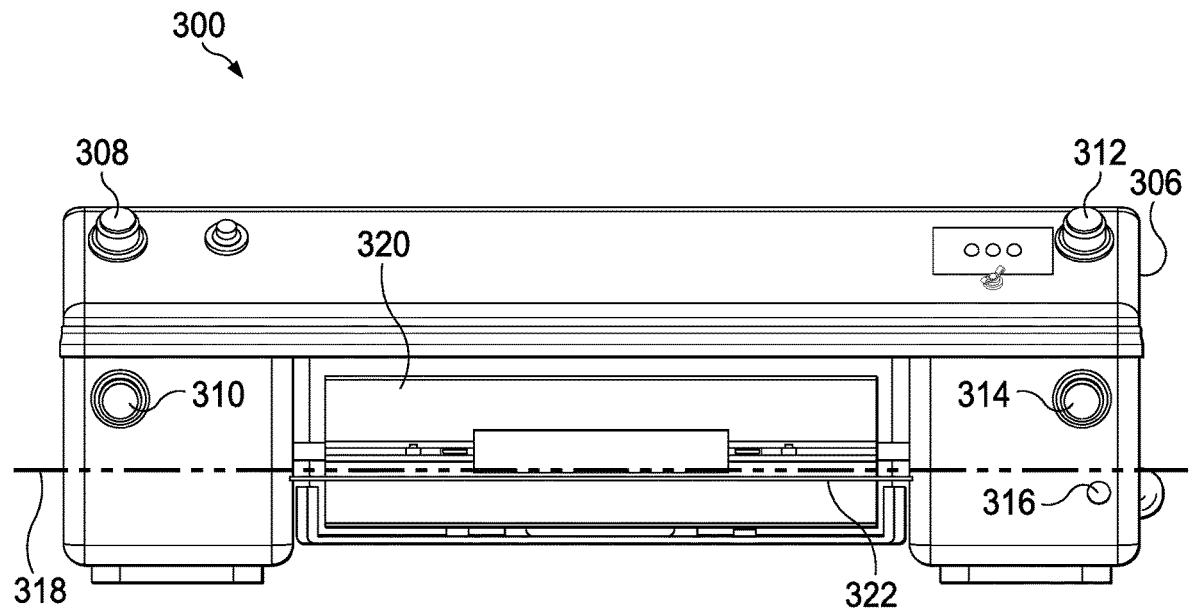
FIG. 4 is an illustration of a front face view of a swimming pool skimmer in accordance with an illustrative embodiment.
Figure 5:
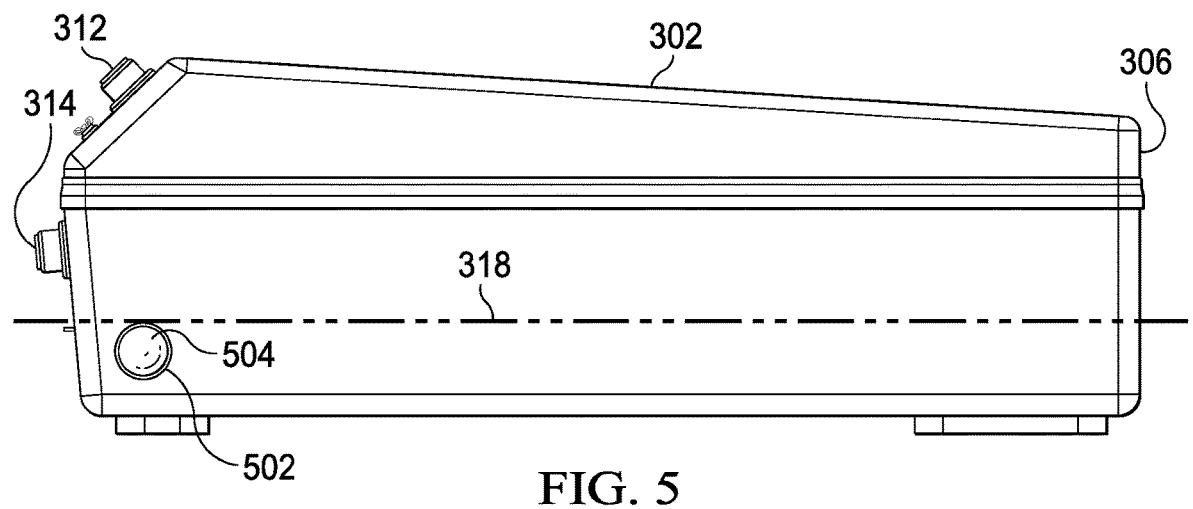
FIG. 5 is an illustration of a port side face view of a swimming pool skimmer in accordance with an illustrative embodiment.

With reference next to FIGS. 4 and 5, illustrations of face views of a swimming pool skimmer are depicted according to an illustrative embodiment. Specifically, FIG. 4 is a front view of swimming pool skimmer 300 of FIG. 3. FIG. 5 is a port side view of swimming pool skimmer 300 of FIG. 3.

As depicted in FIG. 5, swimming pool skimmer 300 includes inlet port 502. Inlet port 502 is an example of one of set of inlet ports 120 shown in block form in FIG. 1.

Inlet port 502 extends through skimmer body 306 and is associated with a pump jet (not shown), such as one of set of pump jets 118 shown in block form in FIG. 1. The associated pump jet can be retained within the interior of skimmer body 306. Inlet port 502 is positioned beneath waterline 318 of skimmer body 306. Inlet port 502 allows water to pass through skimmer body 306 and to enter the associated pump jet.

An associated pump jet increases the pressure of fluid entering through inlet port 502, and expels the pressurized fluid outwardly through outlet port 316. As depicted, outlet port 316 of the associated pump jet is positioned around the periphery of skimmer body 306. Water expelled from outlet port 316 creates a torque that rotates swimming pool skimmer 300.

As depicted, swimming pool skimmer 300 includes screen filter 504. Screen filter 504 is an example of one of set of screen filters 126 shown in block form in FIG. 1. Screen filter 504 is associated with inlet port 502 and prevents the intake of debris from the swimming pool into an associated pump jet. Screen filter 504 is a type of rigid or semi-rigid mesh applied over and protruding outwardly from skimmer body 306.

As depicted, screen filter 504 protrudes outwardly from skimmer body 306 according to a protruding shape of screen filter 504. The protruding shape of screen filter 504 is configured to reduce a pressure differential between inlet port 502 and a surrounding fluid when the associated pump jet is activated. By reducing the pressure differential, screen filter 504 reduces or eliminates debris that might otherwise become entrapped against non-protruding screen filters, thereby reducing the operational efficiency of the associated pump jet. As depicted, screen filter 504 has a hemispherical shape that protrudes outwardly from skimmer body 306.

Figure 6:
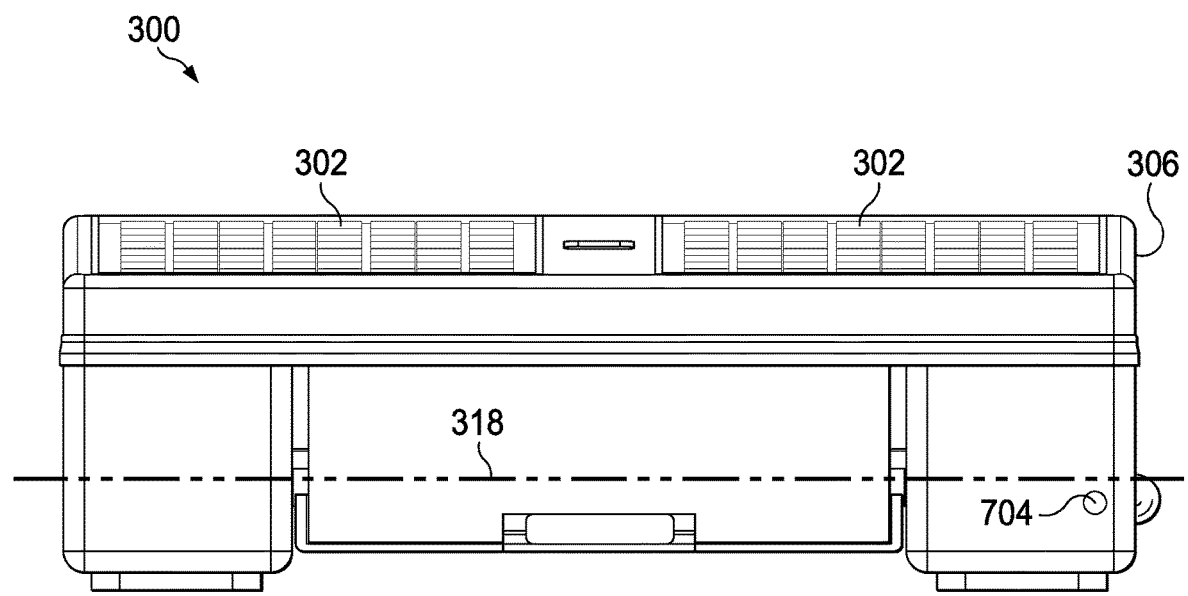
FIG. 6 is an illustration of a rear face view of a swimming pool skimmer in accordance with an illustrative embodiment.
Figure 7:
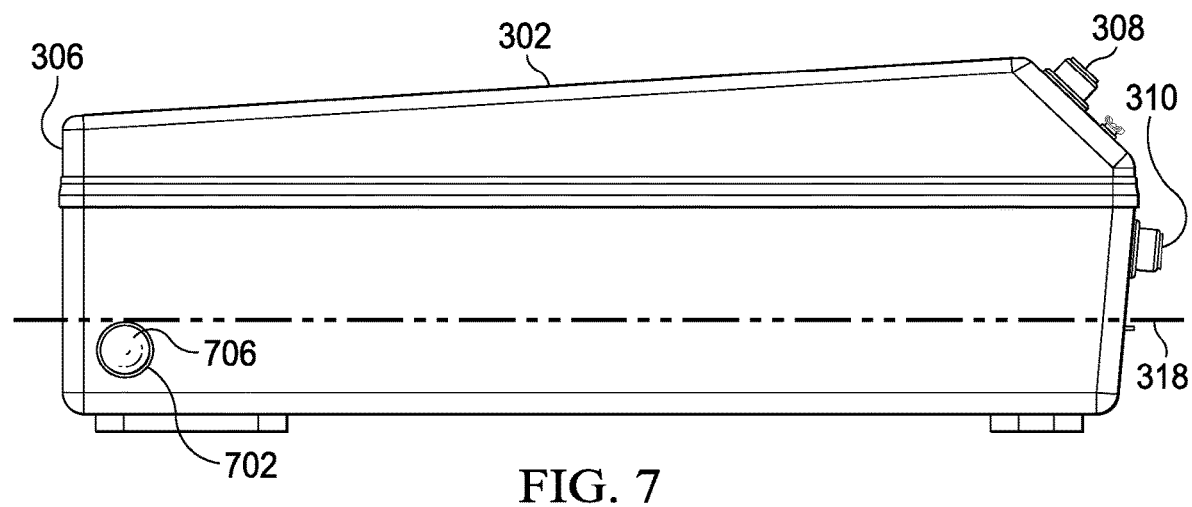
FIG. 7 is an illustration of a starboard side face view of a swimming pool skimmer in accordance with an illustrative embodiment.

With reference next to FIGS. 6 and 7, illustrations of face views of a swimming pool skimmer are depicted according to an illustrative embodiment. Specifically, FIG. 6 is a rear view of swimming pool skimmer 300 of FIG. 3. FIG. 7 is a starboard side view of swimming pool skimmer 300 of FIG. 3.

As depicted in FIG. 7, swimming pool skimmer 300 includes inlet port 702. Inlet port 702 is an example of one of set of inlet ports 120 shown in block form in FIG. 1.

Inlet port 702 extends through skimmer body 306 and is associated with a pump jet (not shown), such as one of set of pump jets 118 shown in block form in FIG. 1. The associated pump jet can be retained within the interior of skimmer body 306. Inlet port 702 is positioned beneath waterline 318 of skimmer body 306. Inlet port 702 allows water to pass through skimmer body 306 and to enter the associated pump jet.

An associated pump jet increases the pressure of fluid entering through inlet port 702, and expels the pressurized fluid outwardly through outlet port 704 shown in FIG. 6. As depicted, outlet port 704 of the associated pump jet is positioned around the periphery of skimmer body 306. Water expelled from outlet port 704 creates a torque that rotates swimming pool skimmer 300.

As depicted, outlet port 704 is positioned opposite from outlet port 316, shown in FIG. 4, and is distally located around the periphery of skimmer body 306 from outlet port 316. Outlet port 704 is directed opposite from, and off-axis from outlet port 316. When activated, the off-axis and opposing outputs from outlet port 316 and outlet ports 704 create a torque that rotates swimming pool skimmer 300.

As depicted, swimming pool skimmer 300 includes screen filter 706. Screen filter 706 is an example of one of set of screen filters 126 shown in block form in FIG. 1. Screen filter 706 is associated with inlet port 702 and prevents the intake of debris from the swimming pool into an associated pump jet. Screen filter 706 is a type of rigid or semi-rigid mesh applied over and protruding outwardly from skimmer body 306.

As depicted, screen filter 706 protrudes outwardly from skimmer body 306 according to a protruding shape of screen filter 706. The protruding shape of screen filter 706 is configured to reduce a pressure differential between inlet port 702 and a surrounding fluid when the associated pump jet is activated. By reducing the pressure differential, screen filter 706 reduces or eliminates debris that might otherwise become entrapped against non-protruding screen filters, thereby reducing the operational efficiency of the associated pump jet. As depicted, screen filter 706 has a hemispherical shape that protrudes outwardly from skimmer body 306.

Figure 8:
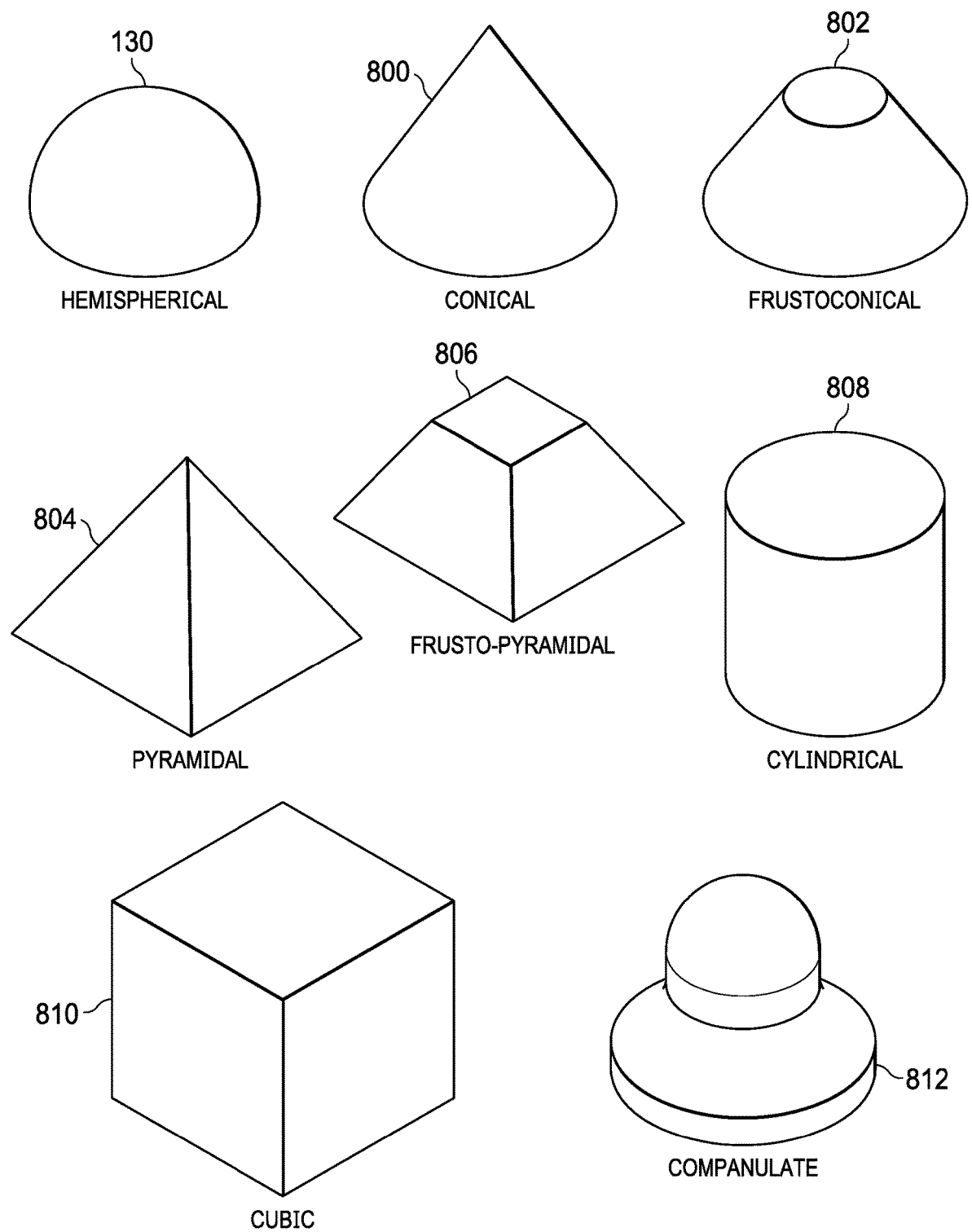
FIG. 8 is an illustration of exemplary protruding shapes for a set of screen filters of a swimming pool skimmer in accordance with an illustrative embodiment.

With reference now to FIG. 8, an illustration of exemplary protruding shapes for a set of screen filters of a swimming pool skimmer is depicted in accordance with an illustrative embodiment. The shapes depicted in FIG. 8 are examples of protruding shape 128 for screen filters 126, both shown in block form in FIG. 1.

As illustrated, the protruding shapes can be one or more of hemispherical shape 130, conical shape 800, frustoconical shape 802, pyramidal shape 804, frusto-pyramidal shape 806, cylindrical shape 808, cubic shape 810, and companulate shape 812, as well as other suitable shapes.

Figure 9:
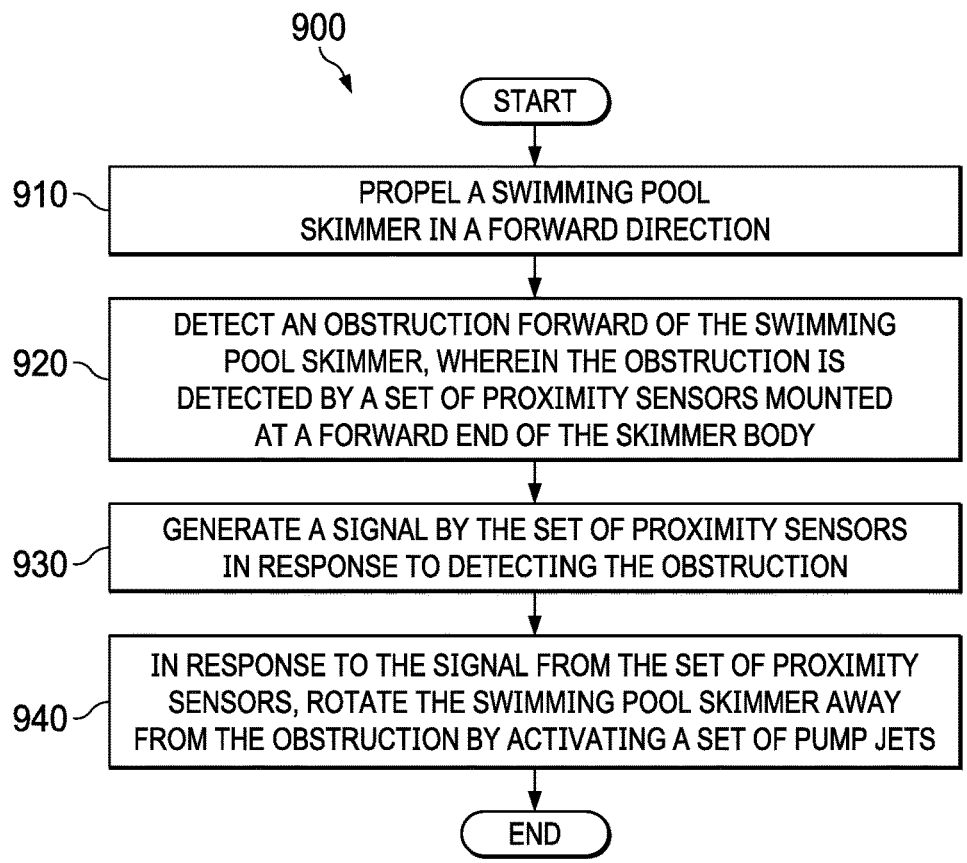
FIG. 9 is an illustration of a flowchart for a process of removing debris from a swimming pool in accordance with an illustrative embodiment.

With reference now to FIG. 9, an illustration of a flowchart for a process of removing debris from a swimming pool is depicted in accordance with an illustrative embodiment. The process can be implemented in the various components of a swimming pool skimmer, such as swimming pool skimmer 100 shown in block form in FIG. 1.

Process 900 begins by propelling a swimming pool skimmer in a forward direction (step 910). The swimming pool skimmer can be propelled in a forward direction by a set of paddlewheels, such as set of paddlewheels 140 shown in block form in FIG. 1.

Process 900 detects an instruction forward of the swimming pool skimmer (step 920). The obstruction can be detected by a set of proximity sensors, such as set of proximity sensors 112 shown in block form in FIG. 1. The set of proximity sensors can be mounted at a forward end of a skimmer body of the swimming pool skimmer.

Process 900 generates a signal in response to detecting the obstruction (step 930). The signal can be generated by the set of proximity sensors and sent to a microcontroller, such as microcontroller 210 shown in block form in FIG. 2.

In response to the signal from the proximity sensors, process 900 activates a set of pump jets (step 940), with the process terminating thereafter. The set of pump jets can be, for example, set of pump jets 118 shown in block form in FIG. 1. Activating the set of pump jets causes a torque on the swimming pool skimmer, rotating the swimming pool skimmer away from the obstruction.

Figure 10:
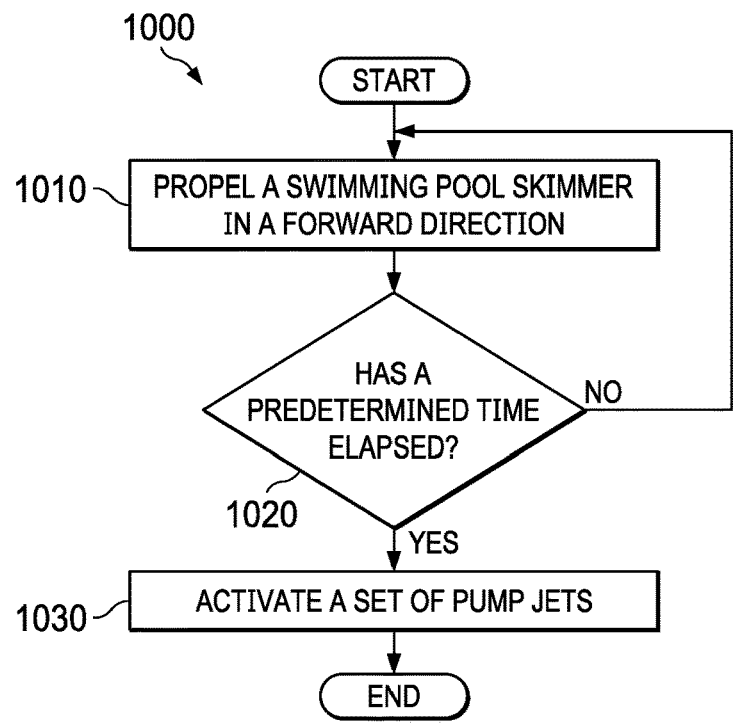
FIG. 10 is an second illustration of a flowchart for a process of removing debris from a swimming pool in accordance with an illustrative embodiment.

With reference now to FIG. 10, an illustration of a flowchart for a process of removing debris from a swimming pool is depicted in accordance with an illustrative embodiment. The process can be implemented in the various components of a swimming pool skimmer, such as swimming pool skimmer 100 shown in block form in FIG. 1.

Process 1000 begins by propelling a swimming pool skimmer in a forward direction (step 1010). The swimming pool skimmer can be propelled in a forward direction by a set of paddlewheels, such as set of paddlewheels 140 shown in block form in FIG. 1.

Process 1000 determines whether a predetermined time has elapsed (step 1020). The predetermined time can be, for example, a recurring time period or a time period measured from a most recent activation of a set of pump jets. The set of pump jets can be, for example, set of pump jets 118 shown in block form in FIG. 1. The predetermined time can be, for example, a predetermined time between about zero and ten minutes, preferably between about one and five minutes, and most preferably about three minutes.

In response to determining that the predetermined time has not elapsed ("no" at step 1020), process 1000 returns to step 1010. In response to determining that the predetermined time has elapsed ("yes" at step 1020), process 1000 activates a set of pump jets (step 1030), with the process terminating thereafter. In this illustrative example, the pump jets are briefly activated and subsequently deactivated shortly thereafter. Activating the set of pump jets causes a torque on the swimming pool skimmer, thus rotating the swimming pool skimmer and possibly avoiding any undetected obstruction.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
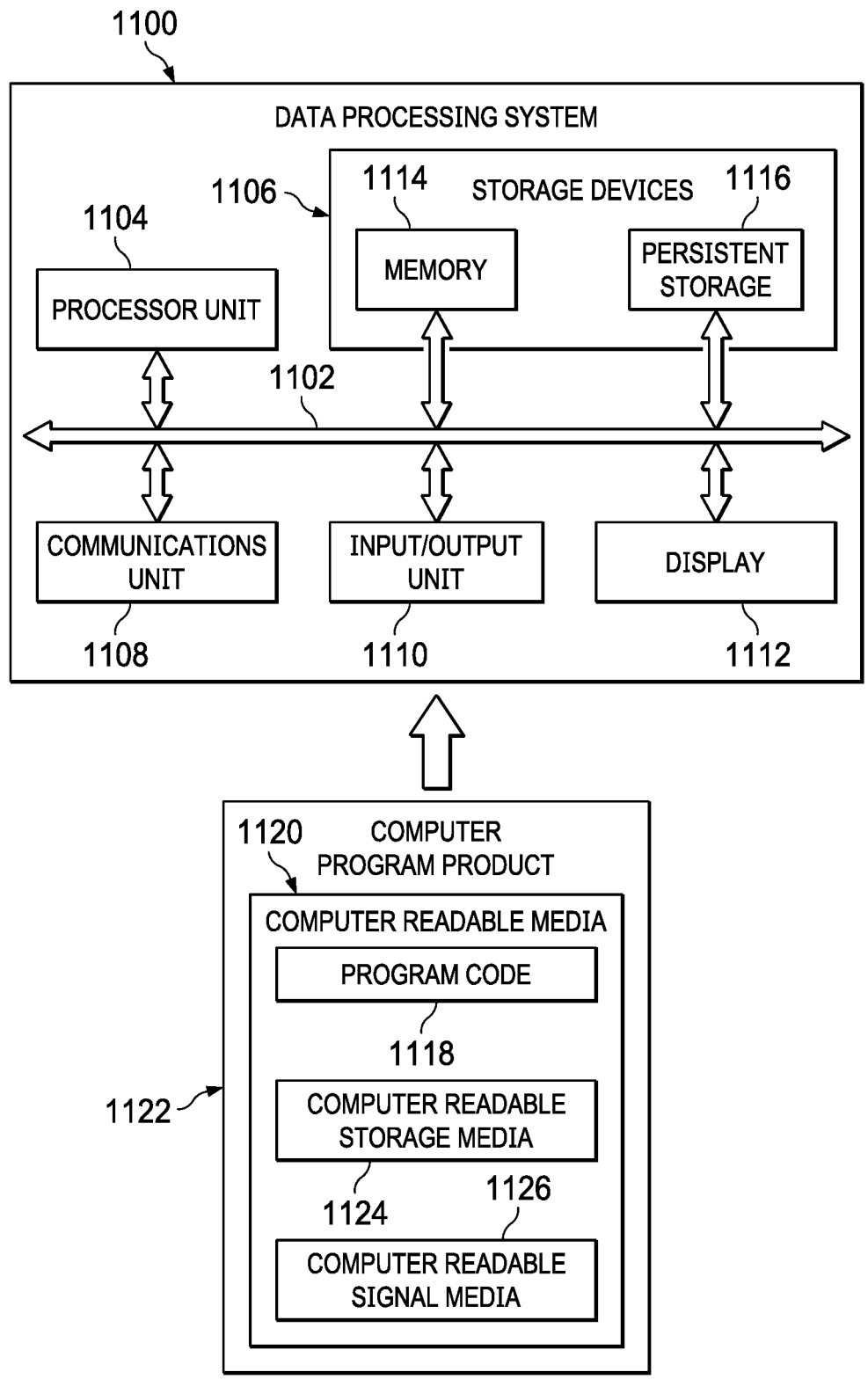
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement microcontroller 210 in FIG. 2. In this illustrative example, data processing system 400 includes communications framework 1102, which provides communications between processor unit 1104, memory 1106, persistent storage 1108, communications unit 1110, input/output (I/O) unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer readable storage devices in these illustrative examples. Memory 1106, in these examples, may be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid state hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A swimming pool skimmer comprising:
    a buoyant skimmer body;
    an electrical power supply including a solar cell mounted to a topside of the buoyant skimmer body;
    a set of proximity sensors operatively connected to the electrical power supply and mounted at a forward end of the buoyant skimmer body, wherein the set of proximity sensors is configured to generate a signal in response to detecting an obstruction;
    a set of pump jets operatively connected to both the electrical power supply and the set of proximity sensors, wherein the set of pump jets is configured to activate in response to the signal from the set of proximity sensors thereby rotating the swimming pool skimmer;
    a set of inlet ports extending through the buoyant skimmer body and configured to allow a fluid intake to the set of pump jets; and
    a set of screen filters associated with the set of inlet ports and protruding outward from the buoyant skimmer body, wherein the set of screen filters has a protruding shape configured to reduce a pressure differential between an inlet port and a surrounding fluid when the set of pump jets is activated.

2. The swimming pool skimmer of claim 1, wherein the buoyant skimmer body further comprises:
    a set of outlet ports extending through the buoyant skimmer body and configured to allow a fluid output from the set of pump jets, wherein both the set of inlet ports and the set of outlet ports are positioned beneath a waterline of the buoyant skimmer body.

3. The swimming pool skimmer of claim 1, wherein a protruding shape of the screen filters is selected from the group consisting of a hemispherical shape, a conical shape, a frustoconical shape, a pyramidal shape, a frusto-pyramidal shape, a cylindrical shape, a cubic shape, and a companulate shape.

4. The swimming pool skimmer of claim 1, wherein the set of pump jets further comprises:
    a plurality of pump jets, wherein each pump jet of the plurality of pump jets is positioned opposite a corresponding pump jet that is distally located around the buoyant skimmer body.

5. The swimming pool skimmer of claim 1, further comprising:
    a channel extending through the buoyant skimmer body from a forward end of the buoyant skimmer body to a stern of the buoyant skimmer body.

6. The swimming pool skimmer of claim 5, further comprising:
    a set of paddlewheels operatively connected to the electrical power supply and rotatably mounted within the channel, wherein the set of paddlewheels is configured to forwardly propel the buoyant skimmer body.

7. The swimming pool skimmer of claim 6, further comprising:
    a debris basket removably mounted within the channel.

8. The swimming pool skimmer of claim 7, wherein the set of paddlewheels further comprises:
    a forward mounted paddlewheel, wherein the forward mounted paddlewheel is further configured to propel fluid and debris through the channel and into the debris basket.

9. A method for removing debris from a swimming pool, the method comprising:
    propelling a swimming pool skimmer in a forward direction;
    detecting an obstruction forward of the swimming pool skimmer, wherein the obstruction is detected by a set of proximity sensors mounted at a forward end of a skimmer body;
    generating a signal by the set of proximity sensors in response to detecting the obstruction; and
    in response to the signal from the set of proximity sensors, rotating the swimming pool skimmer away from the obstruction by activating a set of pump jets, including:
        intaking fluid to the set of pump jets through a set of inlet ports extending through the skimmer body and positioned beneath a waterline of the skimmer body; and
        reducing a pressure differential between an inlet port and a surrounding fluid when the set of pump jets are activated, wherein the pressure differential is reduced via a protruding shape of a set of screen filters that is associated with the set of inlet ports, and wherein the set of screen filters protrudes outwardly from the skimmer body.

10. The method of claim 9, further comprising:
    outputting the fluid from the set of pump jets through a set of outlet ports extending through the skimmer body and positioned beneath the waterline of the skimmer body.

11. The method of claim 9, wherein a protruding shape of the screen filters is selected from the group consisting of a hemispherical shape, a conical shape, a frustoconical shape, a pyramidal shape, a frusto-pyramidal shape, a cylindrical shape, a cubic shape, and a companulate shape.

12. The method of claim 9, wherein the set of pump jets further comprises:
    a plurality of pump jets, wherein a first corresponding pump jet of the plurality of pump jets is positioned opposite a second corresponding pump jet that is distally located around a skimmer body, wherein an output port for the first corresponding pump jet is directed opposite to and off-axis from the output port for the second corresponding pump jet, wherein rotating the swimming pool skimmer away from the obstruction further comprises:
        outputting fluid from both the first corresponding pump jet and the second corresponding pump jet to create a torque that rotates the swimming pool skimmer.

13. The method of claim 9, wherein propelling the swimming pool skimmer in the forward direction further comprises:

rotating a set of paddlewheels mounted within a channel extending through the skimmer body from the forward end of the skimmer body to a stern of the skimmer body.

14. The method of claim 13, further comprising:
propelling fluid and the debris through the channel and into a debris basket; and
collecting the debris in the debris basket.

15. The method of claim 14, wherein the debris basket is removably mounted within the channel between a forward mounted paddlewheel and a stern mounted paddlewheel of the set of paddlewheels.

16. The method of claim 15, wherein propelling the fluid and the debris through the channel and into a debris basket further comprises:
rotating the forward mounted paddlewheel to propel the fluid and the debris through the channel and into the debris basket.

17. A swimming pool skimmer comprising:
a buoyant skimmer body;
an electrical power supply including a solar cell mounted to a topside of the buoyant skimmer body;
a set of proximity sensors operatively connected to the electrical power supply and mounted at a forward end of the buoyant skimmer body, wherein the set of proximity sensors is configured to generate a signal in response to detecting an obstruction;
a set of pump jets operatively connected to both the electrical power supply and the set of proximity sensors;
a set of inlet ports extending through the buoyant skimmer body and configured to allow a fluid intake to the set of pump jets;
a set of screen filters associated with the set of inlet ports and protruding outward from the buoyant skimmer body, wherein the set of screen filters has a protruding shape configured to reduce a pressure differential between an inlet port and a surrounding fluid when the set of pump jets is activated;
a set of outlet ports extending through the buoyant skimmer body and configured to allow a fluid output from the set of pump jets;
wherein both the set of inlet ports and the set of outlet ports are positioned beneath a waterline of the buoyant skimmer body; and
wherein the set of pump jets is configured to activate in response to the signal from the set of proximity sensors thereby rotating the swimming pool skimmer.

18. The swimming pool skimmer of claim 17, wherein the set of pump jets further comprises:
a plurality of pump jets, wherein each pump jet of the plurality of pump jets is positioned opposite a corresponding pump jet that is distally located around the buoyant skimmer body.

19. The swimming pool skimmer of claim 17, further comprising:
a channel extending through the buoyant skimmer body from a forward end of the buoyant skimmer body to a stern of the buoyant skimmer body.

20. The swimming pool skimmer of claim 19, further comprising:
a debris basket removably mounted within the channel.

21. The swimming pool skimmer of claim 20, further comprising:
a set of paddlewheels operatively connected to the electrical power supply and rotatably mounted within the channel, wherein the set of paddlewheels is configured to forwardly propel the buoyant skimmer body, wherein the set of paddlewheels further comprises a forward mounted paddlewheel further configured to propel fluid and debris through the channel and into the debris basket.

22. The swimming pool skimmer of claim 17, wherein the protruding shape of the screen filters is selected from the group consisting of a hemispherical shape, a conical shape, a frustoconical shape, a pyramidal shape, a frusto-pyramidal shape, a cylindrical shape, a cubic shape, and a companulate shape.

* * * * *